United States Patent [19]

Maeda

[11] Patent Number: 5,396,281
[45] Date of Patent: Mar. 7, 1995

[54] IMAGE INPUT APPARATUS FOR DISPLAYING A POSITIONABLE CURSOR MARK ON A REPRODUCED IMAGE

[75] Inventor: Yutaka Maeda, Tokyo, Japan

[73] Assignee: Fuji Photo Film Co., Ltd., Kanagawa, Japan

[21] Appl. No.: 19,903

[22] Filed: Feb. 19, 1993

[30] Foreign Application Priority Data

Feb. 19, 1992 [JP] Japan .................................... 4-32360

[51] Int. Cl.⁶ ............................................ H04N 7/18
[52] U.S. Cl. .................................. 348/141; 348/589; 348/601
[58] Field of Search .................. 358/93; 348/589, 601, 348/141; H04N 7/18

[56] References Cited

U.S. PATENT DOCUMENTS

| | | | |
|---|---|---|---|
| 2,938,949 | 5/1960 | Vosburgh et al. | 348/601 |
| 3,562,415 | 2/1971 | Michels | 348/601 |
| 3,780,221 | 12/1973 | Narbaits-Jauregly | 178/6.8 |
| 4,164,760 | 8/1979 | Inaba et al. | 348/601 |
| 4,214,265 | 7/1980 | Olesen | 358/93 |
| 4,760,458 | 7/1988 | Watanabe et al. | 358/256 |
| 4,996,598 | 2/1991 | Hara | 348/584 |
| 5,090,800 | 2/1992 | Ushiro . | |
| 5,153,712 | 10/1992 | Masaike | 348/589 |
| 5,177,624 | 1/1993 | Sato | 348/601 |
| 5,293,540 | 3/1994 | Trani et al. | 348/589 |

Primary Examiner—Howard W. Britton

[57] ABSTRACT

An image input apparatus has a video camera which photographs an object placed on a stage of the apparatus and which outputs a video signal for reproducing an image of the object on a screen of an external device, such as a monitor. The operator can designate a selected part of the reproduced image by displaying an arrow mark on the image. Display position of the arrow mark is designated by operating cursor keys of a control panel of the image input apparatus while referring to the monitor. The display position is entered in the form of a pair of coordinate values of X-Y coordinates which are defined on the screen. In accordance with the coordinate values, data for displaying the arrow mark as a dot pattern is read from a memory in synchronism with the video signal and mixed with the video signal.

8 Claims, 4 Drawing Sheets

| Y \ X | 000 | 001 | 010 | 011 | 100 | 101 | 110 | 111 |
|---|---|---|---|---|---|---|---|---|
| 000 | 0 | 0 | 0 | 0 | 0 | 0 | 0 | 0 |
| 001 | 0 | 1 | 1 | 1 | 1 | 1 | 0 | 0 |
| 010 | 0 | 1 | 1 | 1 | 0 | 0 | 0 | 0 |
| 011 | 0 | 1 | 1 | 1 | 1 | 0 | 0 | 0 |
| 100 | 0 | 1 | 0 | 1 | 1 | 1 | 0 | 0 |
| 101 | 0 | 1 | 0 | 0 | 1 | 1 | 1 | 0 |
| 110 | 0 | 0 | 0 | 0 | 0 | 1 | 0 | 0 |
| 111 | 0 | 0 | 0 | 0 | 0 | 0 | 0 | 0 |

27

IMAGE INPUT APPARATUS FOR DISPLAYING A POSITIONABLE CURSOR MARK ON A REPRODUCED IMAGE

BACKGROUND OF THE INVENTION

1. Field of the Invention

The present invention relates to an image input apparatus for photographing an object and inputting a video signal for reproducing an image of the object on a screen. In particular, the present invention relates to an image input apparatus which functions to display a cursor mark, such as an arrow mark, on the reproduced image.

2. Description of the Background Art

Image input apparatuses such as a video presentation camera or the like are known. The image input apparatus is constructed of a stage and a video camera for photographing an object, such as a document or a sample, placed on the stage. The image input apparatus is used, for example, by a reporter or a lecturer during a meeting so as to output a video signal for reproducing an image of the object to at least an external unit such as cathode ray tube (CRT) display devices, liquid crystal display (LCD) devices, or an LCD projector. The image of the object is reproduced on a large scale screen by the LCD projector or on respective screens of a plurality of display devices, so that many people can simultaneously observe the object.

In order to direct the attention of the observers to a selected part of the object on the screen, the reporter directly points at the selected part of the object on the stage by using a stick or a pen. As a result, the image of the stick indicating the selected part of the object is displayed on the screen.

However, the image of the indicating stick hides a relatively large area of the image of the object from view. Even if the indicating stick is transparent except for the tip portion, the quality of the image of the object in the area photographed through the transparent portion of the stick is unavoidably lowered. This problem of the conventional image input apparatus is serious especially when the object to be photographed by the video camera contains fine characters or figures.

SUMMARY OF THE INVENTION

In view of the foregoing, an object of the present invention is to provide an image input apparatus wherein a selected portion of an image of an object reproduced on a screen can be pointed out without interfering or degrading the image.

Another object of the present invention is to provide an image input apparatus by which it is possible to display an image of an object and a cursor mark as a composite image.

To achieve the above and other objects, the present invention designates a display position of a mark on a screen, generates a secondary video signal for displaying the mark in the designated display position, and mixes the secondary video signal with the video signal for reproducing the image of the object to display the mark at the designated display position on the screen together with the image of the object.

According to a preferred embodiment of the invention, the display position of the mark is designated by a pair of coordinate values of X-Y coordinates which are defined on the screen. Coordinate values are determined based on a signal entered through a mark shift device, such as cursor keys, for shifting the mark two-dimensionally on the screen.

Since the mark may be small, the image of the object is only slightly obstructed by the mark. It is advantageous to designate or move the display position of the mark on the screen by using a data entry device such as cursor keys, which adds a new function to the conventional functions of an image input apparatus.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENT

Figure 1:
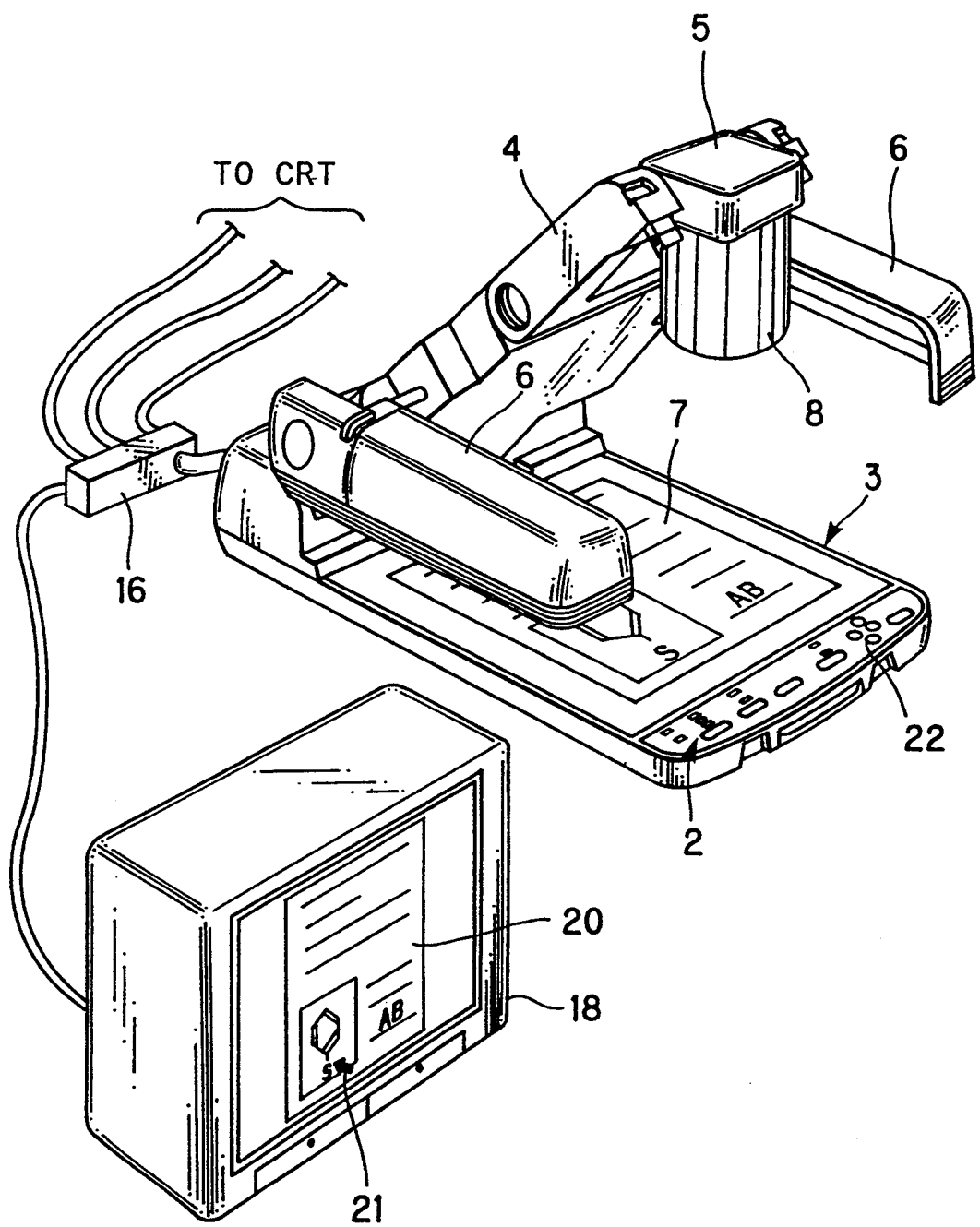
FIG. 1 illustrates an image inputting apparatus according to a preferred embodiment of the invention.
Figure 2:
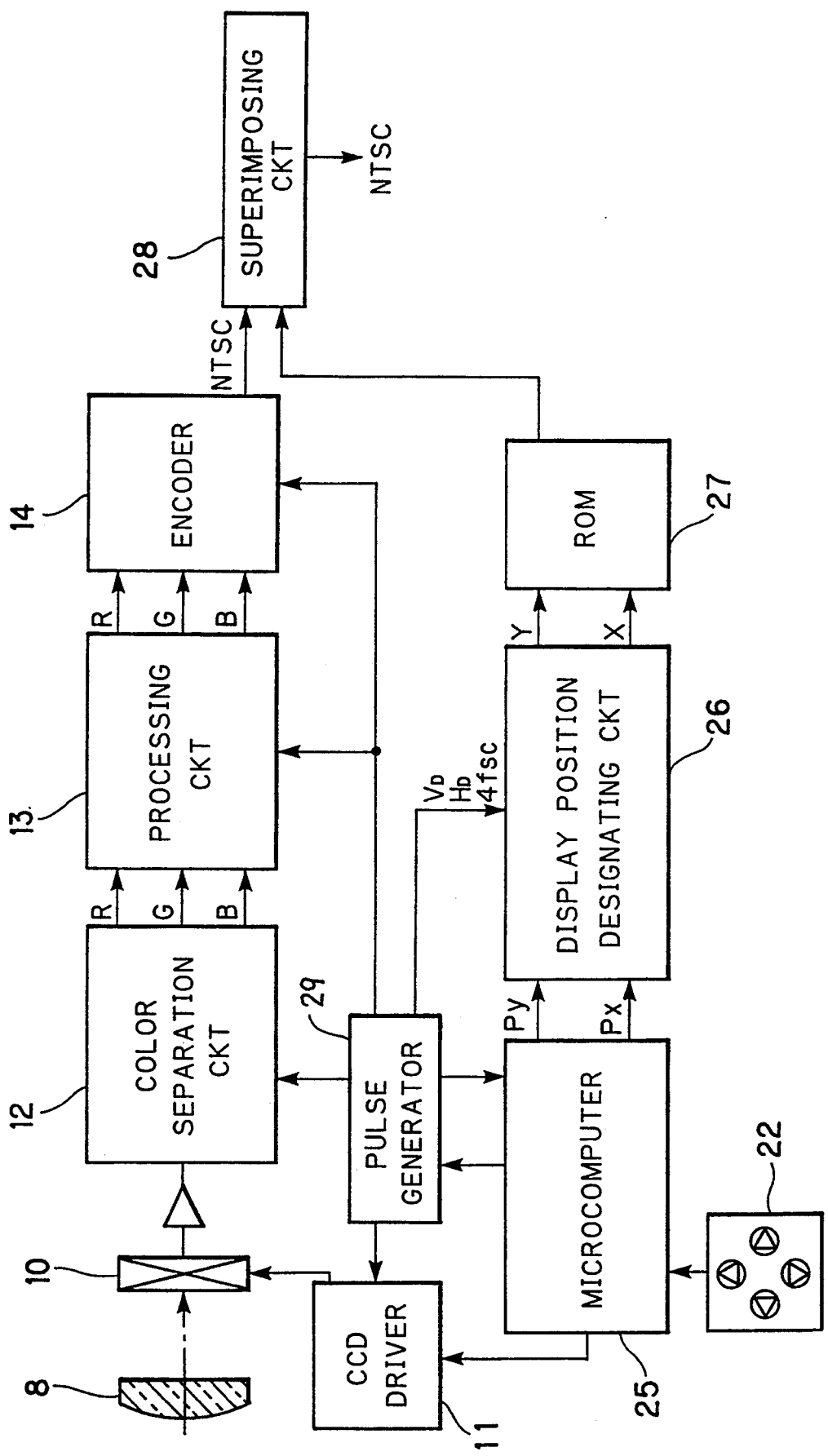
FIG. 2 is a block diagram of an image inputting apparatus of a preferred embodiment of the present invention.

Referring to FIG. 1, the image input apparatus is constructed of a stage 3 in which a control panel 2 is incorporated and an arm portion 4 which is pivotally mounted to the sage 3 and which is movable relative to the stage 3. A video camera 5 is provided on the free end of the arm portion 4. A couple of illuminating devices 6 are also disposed on opposite sides of the arm portion 4 to equally illuminate an original 7 placed on the stage 3. The video camera 5 includes a CCD image sensor 10, as illustrated in FIG. 2, on which an image of the original is formed through taking lens 8. The CCD image sensor 10 photoelectrically detects an image signal of the image.

FIG. 2 schematically shows an image processing section of the video camera 5. The CCD image sensor 10 includes a color separation filter array which consists of a plurality of micro-color filters arranged on a photoelectric conversion surface of the CCD image sensor 10. The color filters are driven by a CCD driver 11 to output the photoelectric image signal serially in accordance with the arrangement of the color filters. A color separation circuit 12 separates the serial image signal into three primary color signals R (red), G (green) and B (blue) with reference to the arrangement of the color filters. A processing circuit 13 processes the three primary color signals R, G and B in a conventional manner. Specifically, the processing circuit 13 controls the gain of each color channel to control the white balance and performs gamma-correction and knee-white-clipping. The processing circuit 13 also performs tone correction in a linear matrix circuit incorporated therein. The three color signals R, G and B processed by processing circuit 13 are modulated in an encoder 14 to be outputted as a NTSC composite color picture signal.

As shown in FIG. 1, the composite color picture signal is distributed by a distributor 16 to a plurality of CRT display units. One of the CRT display units is illustrated as a monitor 18 which may be used by an operator of the image input apparatus, such as a lecturer. Other CRT display units may be provided to be observed by other people, such as spectators or an audience. The operator can position the original 7 on the stage 3 or can adjust the focus and the focal distance of the taking lens 8 while referring to a video image 20 generated on the screen of the CRT monitor 18. The operator can optionally display a cursor mark, such as an arrow mark 21, on the screen of the CRT monitor 18 for indicating a selected part of the video image 20 by operating predetermined keys of the control panel 2, which includes cursor keys 22. Needless to say, the same mark 21 is simultaneously and equivalently displayed on the other CRT display units as on the CRT monitor 18.

To display the mark 21, a microcomputer 25, a display position designating circuit 26, a ROM 27 and a superimposing circuit 28 are provided, as shown in FIG. 2. When the cursor keys 22 are operated for moving the mark 21, the microcomputer 25 reads data from the cursor keys 22 and outputs to the display position designating circuit 26 a pair of coordinate values Px and Py in the form of digital signals which indicate a location on the screen of the CRT monitor 8.

Based on the coordinate values Px and Py, the display position designating circuit 26 determines a leading point of a mark display area in which the mark 21 is to be displayed as a dot pattern and reads dot data having a value "1" or "0" from the ROM 27. For determining the leading point of the mark display area, synchronizing signals and a color subcarrier of the composite color picture signal are also necessary. Therefore a pulse generator 29 is connected to the display position designating circuit 26 to supply a vertical synchronizing signal $V_D$, a horizontal synchronizing signal $H_D$ and a dot clock signal $4f_{sc}$ having a frequency four times higher than that of the color subcarrier to the display position designating circuit 26.

Figures 3, 4:
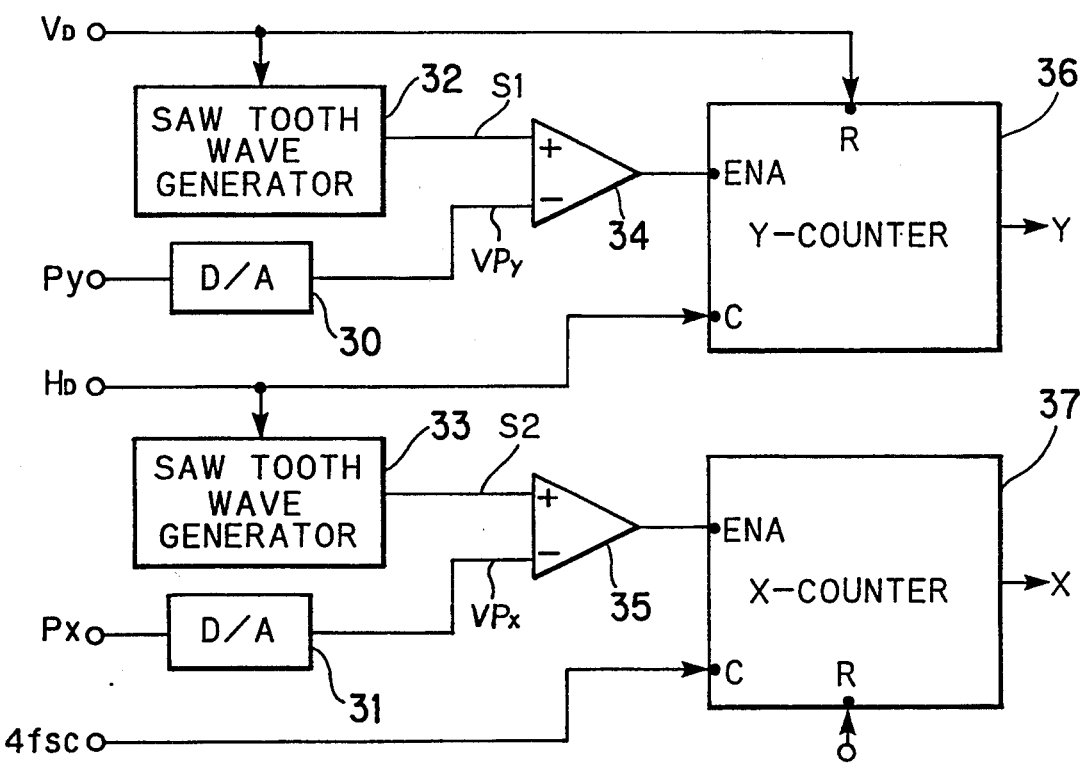
FIG. 3 schematically illustrates a ROM storing dot data for displaying a cursor mark as a dot pattern.
FIG. 4 illustrates an embodiment of a display position designating circuit for designating a display position of the cursor mark.

ROM 27 stores in matrix form the dot data for displaying the mark 21 as a dot pattern, as shown schematically in FIG. 3. Addressing of ROM 27 is performed by using X-address data and Y-address data. For easy understanding, the X-address data and Y-address data respectively consists of three bits in the present embodiment. Based on the X-address data and the Y-address data outputted from the display position designating circuit 26, dot data "1" or "0" is read from the designated address of the ROM 27. The dot data is sent to the superimposing circuit 28.

If the dot data from the ROM 27 is "1", the superimposing circuit 28 produces a voltage signal corresponding to a predetermined brightness level of a pixel constituting the mark 21. The level of the voltage signal is determined in accordance with the video image 20. The voltage signal is transformed into a secondary video signal to be superimposed on the NTSC composite color picture signal. Specifically, the superimposing circuit 28 usually picks up the NTSC composite color picture signal from the encoder 14. However, when dot data having the value "1" is read from the ROM 27 in the mark display area, the superimposing circuit 28 picks up the voltage signal having the predetermined level in place of the NTSC composite color picture signal. The resultant NTSC composite color picture signal is sent to the CRT monitor 18 so that the mark 21 composed in the video image 20 of the original 7 is displayed on the CRT monitor 18.

Figure 5:
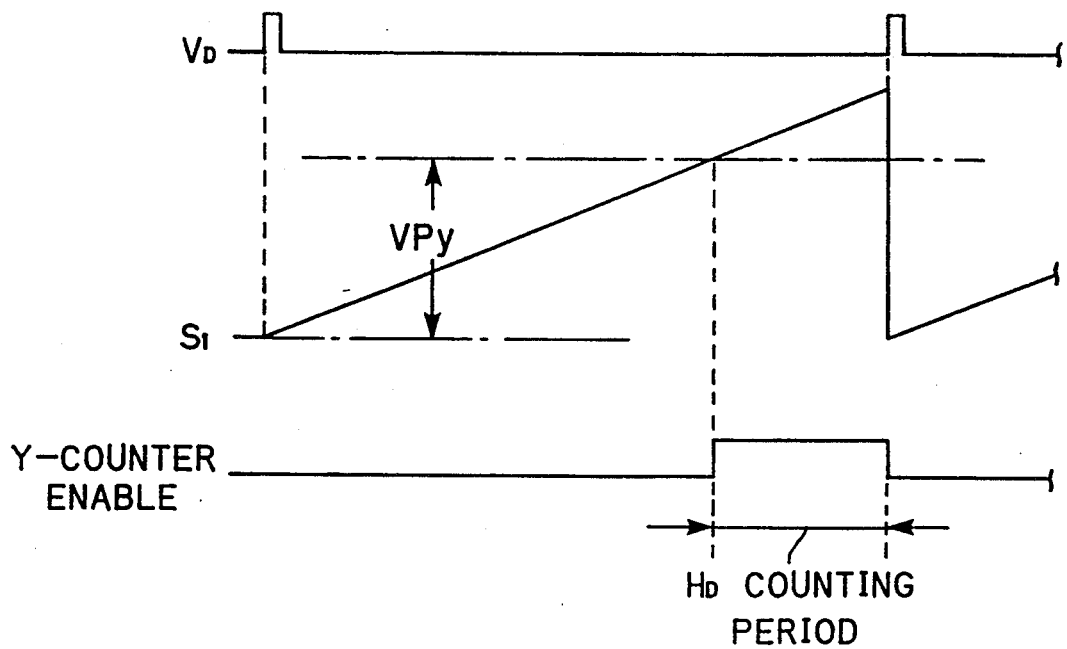
FIG. 5 illustrates timing charts of the operation for determining the display position in the y-coordinate or vertical direction of a screen.

FIG. 4 shows an electric schematic of the display position designating circuit 26. The coordinate values Py and Px are converted into analog signals, voltage values VPy and VPx respectively, in digital-to-analog (D/A) converters 30 and 31. The voltage value VPY is applied to an inverting input terminal of a comparator 34. The comparator 34 receives at its non-inverting input terminal a saw tooth wave signal S1, which is generated from a saw tooth wave generator 32. The cycle of the saw tooth wave signal S1 coincides with the cycle of the vertical synchronizing signal $V_D$, as shown in FIG. 5. The output of the comparator 34 is connected to an enabling terminal of a Y-counter 36. The Y-counter 36 counts in binary the pulse number of the horizontal synchronizing signal $H_D$ and outputs the Y-address data to the ROM 27.

Since the voltage level of the saw tooth signal S1 linearly goes up in each cycle of the vertical synchronizing signal $V_D$, a voltage value of the saw tooth signal S1 represents a vertical location in a field of the video image 20 on the screen of the CRT monitor 18.

Figure 6:
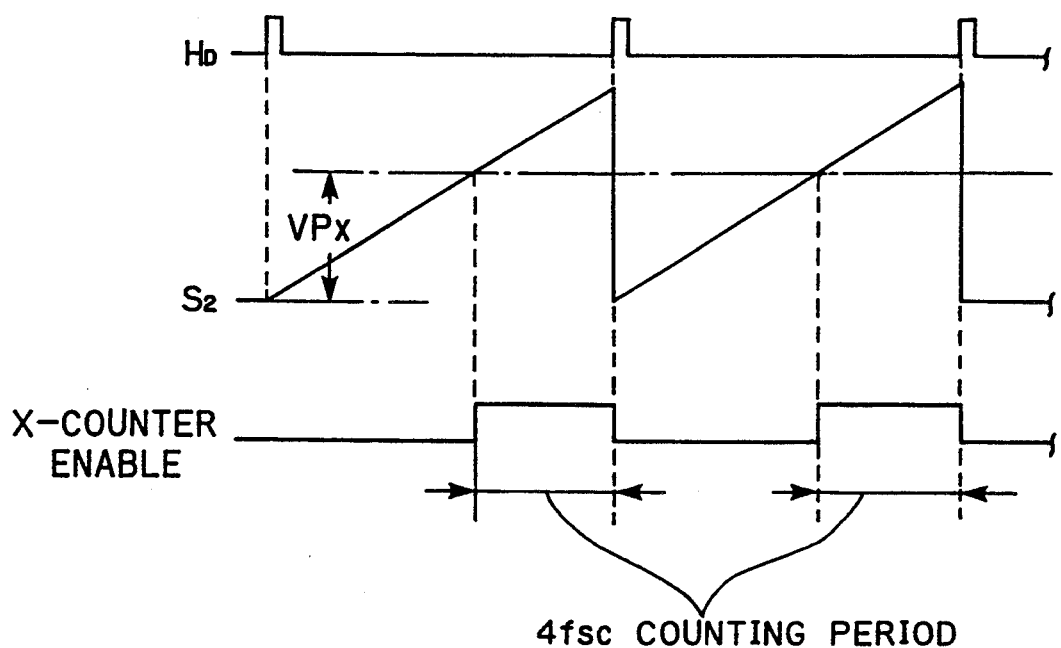
FIG. 6 illustrates timing charts of the operation for determining the display position in the x-coordinate or horizontal direction of the screen.

On the other hand, the voltage value VPx is applied to an inverting input of a comparator 35. The comparator 35 receives at its non-inverting input a saw tooth wave signal S2. The saw tooth wave signal S2 is generated from a saw tooth wave generator 33 and has a cycle corresponding to one cycle of the horizontal synchronizing signal $H_D$ as shown in FIG. 6. The output of the comparator 35 is connected to an enabling terminal of a X-counter 37. The X-counter 37 counts in binary the pulse number of the dot clock signal $4f_{sc}$ and outputs the X-address data to the ROM 27. Since the voltage level of the saw tooth signal S2 linearly goes up in each cycle of the horizontal synchronizing signal $H_D$, a voltage value of the saw tooth signal S2 represents a horizontal location on the screen of the CRT monitor 18.

The operation of the above described image inputting apparatus will be described with reference to FIGS. 4 to 6.

In order to display the mark 21 on the CRT monitor 18, first a predetermined key of the control panel 2 is operated. Thereafter, the mark 21 is displayed at an initial position, for instance at an upper left corner of the screen. While the cursor key 22 is being operated to move the mark 21 from the initial position, the microcomputer 25 reads the coordinate values Px and Py by a conventional key scan operation and sends the coordinate values Px and Py respectively to the comparators 35 and 34.

The comparator 34 compares the saw tooth wave S1 with the analog voltage value VPy which corresponds to the y-coordinate value Py of the leading point of the mark display area of the mark 21. At a moment when the level of the saw tooth wave signal S1 rises above the analog voltage value VPy, the output signal of the comparator 34 is inverted, as shown in FIG. 5. This moment corresponds to the start of a horizontal scanning line disposed at the vertical location designated by the y-coordinate value Py, that is the start of a horizontal scanning of a line which includes the leading point of the mark display area.

Upon receipt of the inverted output signal of the comparator 34, the Y-counter 36 starts counting the pulse number of the horizontal synchronizing signal $H_D$. The count "000", "001", "010" ... of the Y-counter 36 constitutes the Y-address data for the ROM 27. The count of the Y-counter 36 stops at a predetermined maximum value, for instance "111". The Y-counter is reset to "000" by the vertical synchronizing signal $V_D$.

The comparator 35 compares the saw tooth wave S2 with the analog voltage value VPx which corresponds to the x-coordinate value Px of the leading point of the mark display area. At a moment when the level of the saw tooth wave signal S2 rises above the analog voltage value VPx, the output signal of the comparator 35 is inverted, as shown in FIG. 6. This moment coincides with the time when the horizontal location of the leading point designated by the x-coordinate value is determined in each horizontal scanning line.

Upon receipt of the inverted output signal of the comparator 35, the X-counter 37 starts counting the pulse number of the dot clock signal $4f_{sc}$. The count of the x-counter 37 constitutes the X-address data for the ROM 27. The count of the X-counter 37 stops at a predetermined maximum value, for instance "111". The X-counter is reset to "000" by the horizontal synchronizing signal $H_D$. Consequently, the X-counter 37 starts counting for each horizontal scanning when the horizontal location designated by the x-coordinate location is determined by the comparator 35.

Even when the X-counter 37 starts counting to sequentially output the X-address data "001", "010", "011" ... the dot data "1" is not read from the ROM 27 so long as the count of the Y-counter 36 is maintained "000". The dot data "1" begins to be read when both the X- and Y-address data have a value "001". Then, the superimposing circuit 28 produces the secondary video signal based on the dot data, and superimposes the secondary video signal on the NTSC composite color picture signal. In this way, the CRT monitor 18 and other CRT display units display the mark 21 at an appropriate part of the video image 20 of the original 7.

It should be noted that, although the frequency of the dot clock signal $4f_{sc}$ is four times that of the color subcarrier in the present embodiment, the dot clock signal to be counted by the x-counter 37 may have another frequency depending on the desirable horizontal resolution.

It is possible to connect the output of the first comparator 34 to a lead enable terminal of the ROM 27 so as to prevent reading of the ROM 27 until the vertical location of the leading point corresponding to the y-coordinate value Py is determined by the first comparator 34. According to this embodiment, even when the second comparator 35 determines the horizontal location corresponding to the x-coordinate value in each horizontal scanning line, the dot data stored in the memory cell to which Y-address "000" is allocated is not read until the leading point is determined. The ROM 27 begins to be read first from the memory cell designated by "000, 000" when the leading point is determined during scanning.

It is also possible to change the brightness of the mark 21 by controlling the voltage signal produced upon receipt of dot data "1" in the superimposing circuit 28. The mark 21 may be colored by modulating the secondary video signal using the color subcarrier.

It is also possible to display more than one cursor mark for simultaneously indicating a plurality of parts of the image on the screen, wherein the cursor marks may have different colors from each other.

Furthermore, the image input apparatus of the present invention may be connected to LCD devices or an LCD projector which is disclosed, for example, in U.S. Pat. No. 5,090,800.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image input apparatus which images an object to display means for reproducing an image of the object on a screen, the image input apparatus comprising:
    shifting means for shifting a mark on said screen in a two-dimensional direction to designate a display position of said mark on said screen;
    determining means for determining a pair of coordinate values Px and Py of corresponding X-Y coordinates of said mark on the screen in accordance with output signals of said shifting means;
    first generator means for generating a first saw tooth wave signal in synchronism with a horizontal synchronizing signal of the video signal;
    second generator means for generating a second saw tooth wave signal in synchronism with a vertical synchronizing signal of the video signal;
    first comparator means for outputting a first coincidence signal when said first saw tooth wave signal coincides with a first voltage level which corresponds to said coordinate value Px;
    second comparator means for outputting a second coincidence signal when said second saw tooth wave signal coincides with a second voltage level which corresponds to said coordinate value Py;
    X-counter means for counting clock pulses of a predetermined frequency after said first coincidence signal is outputted to generate an X-address signal;
    Y-counter means for counting said horizontal synchronizing signal after said second coincidence signal is outputted to generate a Y-address signal;
    memory means having a plurality of memory cells, each for storing dot data of a respective dot of a dot pattern which represents said mark;
    reading means for reading said dot data from said memory cells by sequentially designating a respective one of said memory cells to be read in accordance with said X-address signal and said Y-address signal to generate a secondary video signal; and
    mixing means for mixing said secondary video signal with said video signal to display said mark at said designated display position together with the image on said screen.

2. The image input apparatus of claim 1, wherein the imaging means comprises a CCD image sensor.

3. The image input apparatus of claim 1, wherein the display means comprises cathode ray tube display means.

4. The image input apparatus of claim 1, wherein a pair of said coordinate values Px and Py represents a display position of a predetermined one of said dots of said dot pattern and said dot data of said predetermined dot is stored in one of said memory cells which is predetermined to be read first.

5. The image input apparatus of claim 4, wherein said secondary video signal has a voltage level corresponding to a predetermined brightness level of a dot of said dot pattern on the screen.

6. The image input apparatus of claim 1, wherein the object comprises a sheet of original document.

7. The image input apparatus of claim 6, wherein said mark is an arrow.

8. A method of imaging an object placed on a stage using imaging means to output a video signal to display means for reproducing an image of the object on a screen, the method of imaging comprising the steps of:

shifting a mark on said screen in a two-dimensional direction to designate a position of said mark on said screen;

determining a pair of coordinate values Px and Py of corresponding X-Y coordinates of said mark on said screen in accordance with said step of shifting;

generating a first saw tooth wave signal in synchronism with a horizontal synchronizing signal of said video signal;

generating a second saw tooth wave signal in synchronism with a vertical synchronizing signal of said video signal;

outputting a first coincidence signal when said first saw tooth wave signal coincides with a first voltage level which corresponds to said coordinate value Px;

outputting a second coincidence signal when said second saw tooth wave signal coincides with a second voltage level which corresponds to said coordinate value Py;

counting clock pulses of a predetermined frequency after said first coincidence signal is outputted to generate an X-address signal;

counting said horizontal synchronizing signal after said second coincidence signal is outputted to generate a Y-address signal;

storing, in each of a plurality of memory cells, dot data of a respective dot of a dot pattern representing said mark;

reading said dot data from said memory cells by sequentially designating a respective one of said memory cells to be read in accordance with said X-address signal and said Y-address signal to generate a secondary video signal; and mixing said secondary video signal with said video signal to display said mark at said designated display position together with the image on said screen.

* * * * *